(No Model.)
E. C. WELCH.
ROTARY WEEDER.
No. 556,601. Patented Mar. 17, 1896.
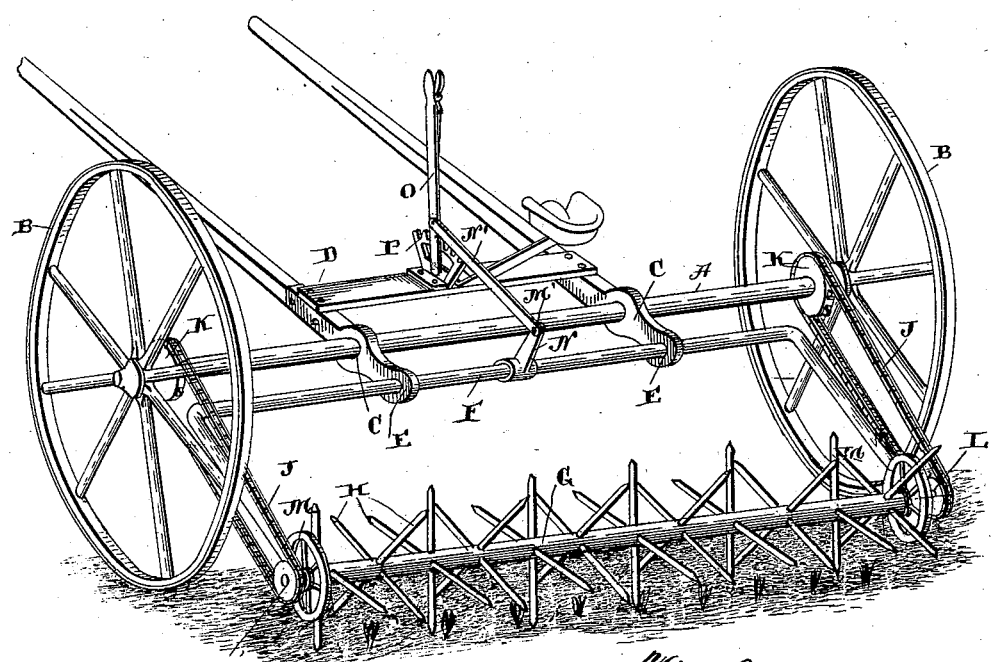
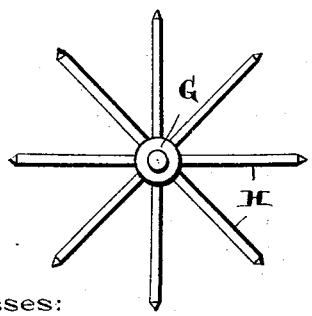
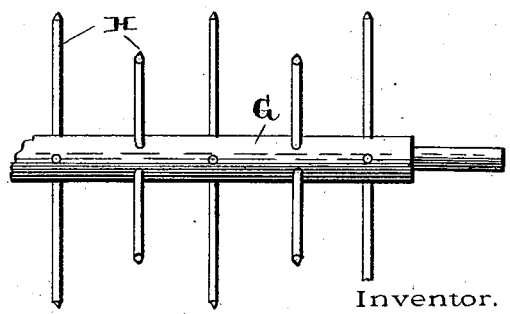
Witnesses:
Inventor.
E. C. Welch
By Pattison Nesbit
Attorneys.

UNITED STATES PATENT OFFICE.

EVERETT C. WELCH, OF FRIEDENS, PENNSYLVANIA.

ROTARY WEEDER.

SPECIFICATION forming part of Letters Patent No. 556,601, dated March 17, 1896.

Application filed July 19, 1895. Serial No. 556,505. (No model.)

*To all whom it may concern:*

Be it known that I, EVERETT C. WELCH, of Friedens, in the county of Somerset and State of Pennsylvania, have invented certain new and useful Improvements in Rotary Weeders; and I do hereby declare the following to be a full, clear, and exact description of the invention, such as will enable others skilled in the art to which it pertains to make and use it, reference being had to the accompanying drawings, which form part of this specification.

This invention pertains to improvements in rotary weeders, the object being to provide an implement of simple and improved construction which will effectually remove the weeds, and at the same time prevent stones and pieces of sod from dragging along with the implement to the injury of the young plants.

With this object in view my invention consists in the novel features of construction hereinafter fully described and claimed and illustrated by the accompanying drawings, in which—

Figure 1 is a perspective view of my improved implement. Figs. 2 and 3 are detail views of the rotary weeder.

A is the main shaft having the drive-wheels B rigidly secured to its ends. Boxings C encircle the shaft, and from the same the thill-frame D is extended in a forward direction. Upon the rear sides of these boxings C project the bearings E, in which is supported the bail-shaped frame F. The arms of this frame extend downward and rearward, and mounted therein is shaft G carrying the teeth or tines H. At each end of this shaft is a small sprocket L connected by chain J to a larger sprocket K on shaft A, so that as the implement is moved forward the weeding-shaft will be revolved. Circular guards M are arranged adjacent brackets I for preventing the teeth or tines from becoming entangled with the sprockets or sprocket-chains in case they are accidentally sprung outward by contact with an obstruction. An arm N is extended upward from the frame F between bearings E, and a pin M' connects the same with link N', the latter at its forward end being secured to the hand-lever O. This lever being fulcrumed at its lower end on the thill-frame a forward movement of the upper end thereof will raise the weeder-carrying frame through the medium of arm N and link N', and a reverse movement will lower the position of said frame. By this arrangement the weeding mechanism may be raised or lowered, as desired, and if it is wished to have the rotary weeder roll upon the ground, so as to follow the contour thereof without injuring the position, the pin M' may be removed. A rack P secured to the thill-frame and operating in conjunction with a hand-lever in the ordinary and well-known manner serves to hold the rotary weeder in a fixed position whether the same be raised or lowered.

The gearing is so arranged that the rotary weeder will have a faster revolution than would be necessary to keep up with the forward motion of the implement, so that the same works the ground effectually and removes the weeds.

The driving-sprocket is here shown as secured to the main shaft; but I do not desire to limit myself to this particular location, as the same may be desired to be secured to the driver and spindles.

By providing a weeder having a faster rotary motion than the forward movement of the implement I secure a most effective stirring of the ground, while at the same time weeds, stones, &c., are not accumulated and dragged forward over the plants, as is the case in weeders having only a raking motion.

Having thus fully described my invention, what I claim, and desire to secure by Letters Patent, is—

1. An improved implement of the class described comprising the main shaft, the drive-wheels, the boxings on the main shaft, the thill-frame extended forward therefrom, the bearings extended rearward from the boxings, the bail-frame secured and adapted to vibrate in said bearings, the rotary weeder journaled in the ends of the said bail-frame, and a mechanism for rotating the weeder, substantially as shown and described.

2. An implement of the class described, comprising the main shaft and drive-wheels, the boxings on the main shaft, the thill-frame extended forward therefrom, the bearings extended rearward from the boxings, the vibratory frame secured in said bearings, the arm extending upward from the frame, the hand-lever, the link for connecting the arm with the hand-lever, the rotary weeder carried by the vibratory frame, the sprocket-wheels and the pinions for imparting a rotary motion to the weeder, substantially as shown and described.

In testimony whereof I affix my signature in presence of two witnesses.

EVERETT C. WELCH.

Witnesses:
CHARLES W. WALKER,
A. L. G. HAY.